3,706,716
ALPHA-METHYLENEGLUTARIMIDE POLYMERS AND COPOLYMERS AND PREPARATION THEREOF
John M. Hoyt, Cincinnati, and Karl Koch, Norwood, Ohio, assignors to National Distillers and Chemical Corporation, New York, N.Y.
No Drawing. Original application Dec. 28, 1967, Ser. No. 694,048. Divided and this application May 28, 1970, Ser. No. 50,008
Int. Cl. C08g 20/20
U.S. Cl. 260—78 UA
12 Claims

ABSTRACT OF THE DISCLOSURE

Homopolymers and copolymers of alpha-methyleneglutarimide and process for preparing same using an initiator which is an alkali metal or an organometallic compound, which polymers can be employed to make fibers, foils and films.

---

This application is a division of U.S. application Ser. No. 694,048, filed Dec. 28, 1967.

This invention relates broadly to polymerization processes and products incorporating alpha-methyleneglutarimides and more particularly, it relates to polymers and copolymers prepared by polymerizing mixtures containing alpha-methyleneglutarimide as a polymerizable monomer, either alone or with other polymerizable monomers.

It is an object of the invention to prepare homopolymers from alpha-methyleneglutarimide.

Another object is the preparation of copolymers of alpha-methyleneglutarimide with other monomers.

These and other objects of the invention will become readily apparent from the description and illustrative embodiment set forth hereinbelow.

Substituted and unsubstituted alpha-methyleneglutarimides can be readily prepared by hydrolysis followed by reaction with ammonia of alpha-methyleneglutaronitrile. The alpha-methyleneglutarimides and, particularly, the alpha-methyleneglutarimide itself, have been found to be highly useful as monomers in both homopolymerizations and copolymeriaztions with other monomers. This cyclic monomer, alpha-methyleneglutarimide has been found to undergo polymerization reactions under a variety of polymerization conditions including thermal polymerization, use of free radical initiators, and catalysts such as alkali metals and organometallic compounds. Thus novel polymeric structures derived from alpha-methyleneglutarimide and containing sequences of this monomer, either alone or in combinations with other monomers are provided by this invention.

The preferred alpha-methyleneglutarimide is prepared by reacting alpha-methyleneglutaronitrile with water in the presence of a mineral acid and at a temperature of at least about 20° C. and preferably at 40–75° C. followed by treatment of the reaction mixture with ammonia to neutralization.

The resulting alpha-methyleneglutarimide is isolated and purified by conventional means.

The mineral acids which are employed in carrying out the initial hydrolysis process of this invention are generally used in the form of aqueous solutions. Examples of suitable mineral acids which may be used are sulfuric, nitric, hydrochloric, and the like. It is also possible to employ organic acids such as acetic acid and mixtures thereof with mineral acids such as perchloric, sulfuric, and the like. Sulfuric acid is the preferred acid for most purposes. The amount of mineral acid employed is not critical. Generally, the amount of acid will range from about 40 to 90% by weight. It is, of course, essential that water be present in carrying out the present process.

Following the hydrolysis of the nitrile by the aqueous acid, it is preferred that the reaction mixture be diluted with an inert water miscible solvent, as for example, ethanol, isopropanol, dioxane or the like. The resulting cold mixture is then treated with anhydrous ammonia until a pH of 7 is reached. Usually this results in a temperature rise which should be controlled in the range of 20–120° C.

At the lower temperatures, the rate of reaction is undesirably slow, while the use of higher temperatures tends to result in the production of undesirable byproducts. It is important, however, that care be exercised and adequate measures taken to control the heat that is created by the addition of the mineral acids, especially during the early stages of the reaction. The pressures which may be employed will range from about atmospheric up to 1000 p.s.i., and preferably from atmospheric to 100 p.s.i. It will be understood, however, that the particular pressure employed is not a critical feature of this invention.

The resulting alpha-methyleneglutarimide is recovered from the reaction product mixture by conventional means. For example, the cold alcoholic solution may be filtered to remove solid impurities and cooled to yield a precipitate of the product.

The alpha-methyleneglutarimide used in the hereinafter described polymerizations can be represented by the following structure:

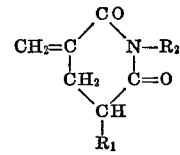

Wherein $R_1$ and $R_2$ are hydrogen, a lower alkyl group such as methyl, ethyl, etc.; an alicyclic group such as cyclohexyl, cyclopentyl; or an aryl group such as phenyl, p-chlorophenyl, and naphthyl; and may be the same or different with the provision that if hydrogen-migration polymerization of the alpha-methylene glutarimide described hereinbelow is intended, $R_2$ must be H; when $R_1$ and $R_2$ are radicals, they may have 1 to 10 carbon atoms. The preferred monomer is alpha-methyleneglutarimide, in which both $R_1$ and $R_2$ are H.

Alpha-methyleneglutarimide and its substituted derivatives can be polymerized by heating either alone or in the presence of a solvent or in the presence of a substance capable of forming free radicals such as a peroxide or an azonitrile or in the presence of an alkali metal or an organometallic compound such as an alkali metal alkyl, a Grignard reagent or a metal alkoxide.

The homo- and copolymerizations of alpha-methyleneglutarimide which are initiated by heating or promoted by conventional radical-forming initiators such as a peroxide or an azonitrile produce vinyl-type polymers (I) in which the polymerization proceeds via the carbon-carbon double bond of alpha-methyleneglutarimide. Using the poly (alpha-methyleneglutarimide) produced by benzoyl peroxide initiation, this structure was substantiated by hydrolysis with hydrochloric acid to a polymeric carboxylic acid and ammonium chloride.

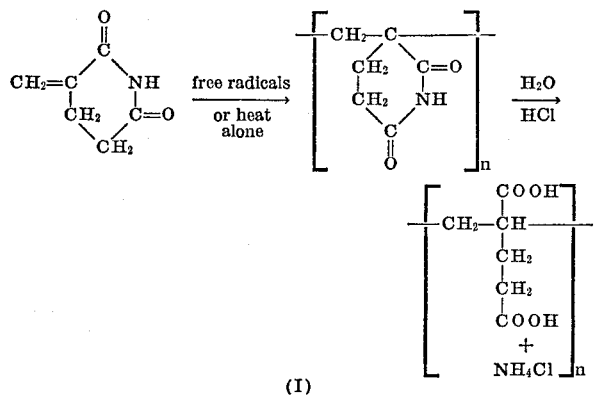

(I)

Use of alkali metal or organometallic initiators, however, produces a polymer of different properties and structure which is hydrolyzed by hydrochloric acid solution to a salt whose infrared absorption spectrum indicates it to be the corresponding amino acid hydrochloride. This second type of polymer is believed to form by hydrogen-migration polymerization and to have the structure (II) shown below:

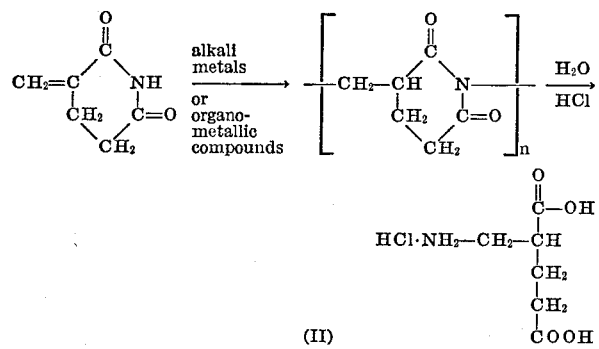

(II)

The comonomers which may be used in polymerization reactions with alpha-methyleneglutarimide include styrene, methyl methacrylate, methyl acrylate, acrylonitrile, butadiene, isoprene, chloroprene, vinylidene chloride, vinyl chloride, ethylene, vinyl acetate, vinylpyrrolidone, and vinyl methyl ether as well as other known dienes, vinyl monomers and other unsaturated compounds.

The solvents for the polymerizations may comprise any solvent capable of dissolving both the alpha-methyleneglutarimide and, if used, the selected comonomer. Solvents which may be employed include alcohols, i.e., methanol, ethanol, n-propanol, 2-propanol; aromatic hydrocarbons, for example, benzene, toluene, xylene; esters, such as ethyl acetate, butyl acetate; ketones, such as acetone, methyl ethyl ketone, cyclohexanone; tertiary amide solvents, such as N,N-dimethylformamide, N,N-dimethylacetamide, tetramethylurea; nitriles, such as acetonitrile, benzonitrile; mildly basic nitrogen compounds, such as pyridine and quinoline; and sulfur-containing solvents such as dimethyl sulfoxide and dimethyl sulfone. When alkali metals and organometallic initiators are employed the choice of solvents is restricted in the sense that solvents containing reactive hydrogen such as alcohols, which react, preferentially with the initiator, are to be avoided.

The useful catalysts or initiators include peroxygen initiators such as organic peroxides, for example, benozyl peroxide, acetyl peroxide, di-tertiary butyl peroxide; organic peresters, for example, tertiary butyl peracetate, tertiary butyl perbenzoate, and tertiary butyl perpivalate; persulfates, for example, potassium persulfate and ammonium persulfate; azonitrile initiators, for example, azo-bis-isobutyronitrile; alkali metals, such as sodium, lithium, and potassium; and organometallic initiators. Such organometallic initiators include metal alkyls, particularly lower metal alkyls, i.e., those having lower alky groups such as butyllithium, butyl sodium, diethylmagnesium and diethylzinc. Also included are metal alkoxides, and particularly lower metal alkoxides, such as sodium ethoxide, sodium isopropoxide and potassium t-butoxide, as well as Grignard reagents such as ethylmagnesium chloride and phenylmagnesium bromide.

Generally, in the procedures employed for the homo- and copolymerization processes of this invention alpha-methyleneglutarimide, and another monomer if a copolymer is to be prepared, are dissolved in a suitable solvent, heated to the polymerization temperature, and the initiator added either alone or in a solvent. The polymerization is continued until the desired level of polymerization is reached and is then terminated for instance by adding the reaction mixture to a non-solvent for the polymer, such as a lower alkanol or water. The polymer so formed is isolated and dried.

In the homopolymerization of alpha-methleneglutarimide either by use of heat or in the presence of free radical-forming catalysts, the monomer can be polymerized in bulk without solvent, although the use of a solvent is preferred. It is important that the solvent chosen be capable of dissolving alpha-methyleneglutarimide monomer at the selected polymerization temperature. A preferred solvent is N,N-dimethylacetamide.

The concentration of monomeric alpha-methyleneglutarimide in the polymerization solvent can vary from about 1 to about 80% by weight based on total weight of monomer and solvent (reaction mixture) with about 10 to about 50% by weight of the monomer being preferred.

The amount of free-radical initiator employed will vary from about 0.01 to 5.0 parts per 100 parts by weight of the alpha-methyleneglutarimide, with 0.05–1.0 parts being preferred. It is to be noted that polymer can be obtained by heat alone without addition of initiator, although it is preferred to use an initiator. Preferred radical-forming initiators are benzoyl peroxide and azo-bis-isobutyronitrile. The preferred alkali metal initiator is sodium and the preferred organometallic initiator is butyllithium.

The temperature of polymerization is dependent on the decomposition temperature of the initiator used, when the initiator is a free radical-forming substance; broadly, however, the polymerization temperature will range from about −50 to 300° C., with 40–150° C. being preferred. When alkali metal or organometallic initiators are employed, the temperatures will range from about −100° C. to 200° C. broadly, and from −50 to +50° C., preferred.

In all cases, the polymerization pressure is autogenous and need only be sufficient to keep the monomer and solvent in the liquid state.

In the copolymerization of alpha-methyleneglutarimide with various polymerizable monomers using free radical-forming initiators, the ratio of alpha-methyleneglutarimide to comonomer charged can vary widely, but will range from about 1 mole percent alpha-methyleneglutarimide to 99 mole percent comonomer to about 99 mole percent alpha-methyleneglutarimide to 1 mole percent comonomer, based on total monomers. The preferred ranges are from 10 to 90 mole percent alpha-methyleneglutarimide, the remainder of the total monomer mixture comprising 90–10 mole percent of the selected comonomer.

The broad and preferred ranges of monomer concentration in the solvent, polymerization temperature, and catalyst concentration for copolymerizations are similar to those for homopolymerization. Preferred solvents are N,N-dimethylacetamide and N,N-dimethylformamide, and benzoyl peroxide and azo-bis-isobutyronitrile are the preferred initiators.

Although solution polymerization techniques are preferred in preparing copolymers of alpha-methyleneglutarimide with comonomers using free radical-forming initiators, it is also within the scope of the invention to carry out the copolymerization in bulk, as well as in suspension and in emulsion in aqueous systems.

In preparing the hydrogen-migrational polymers from alpha-methyleneglutarimide, bulk or solution polymerization may be employed, but solution polymerization is preferred. Various solvents may be used, but active-hydrogen containing solvents are generally to be avoided, as are any other solvents which may react with the alkali metal or organometallic initiator required for this kind of polymerization, e.g., highly chlorinated solvents. The principal requirement of the solvent, other than non-reactivity toward the initiator, is the capacity substantially to dissolve the alpha-methyleneglutarimide at the selected polymerization temperature. Solvents which may be used include benzene, toluene, dimethylacetamide, and the like. Dimethylacetamide is preferred as the solvent.

The concentration of alpha-methyleneglutarimide in the polymerization solvent may range from about 1 to about 80% by weight based on total weight of solvent and monomer, but the preferred range is from about 10 to about 50% by weight.

The initiator may be added as such or in a suitable solvent which may be the same or different from that used in the reaction. Initiator concentration will range from about 0.01 to 5.0 parts per 100 parts of weight of alpha-methyleneglutarimide, with about 0.05 to 1.0 part being preferred.

The polymers and copolymers formed by the herein-described methods find wide application in commercial uses, for example, they can be employed to make fibers, foils and films and can be molded into various shapes. They can be employed as protective or decorative coatings either alone or admixed with other plastics and resins.

In particular, the novel polymeric structures provided by the thermal and free radical initiated polymerization and copolymerization reactions of this invention are subject to further chemical modification, such as graft polymerization and crosslinking, by virtue of the reactive imide hydrogen atoms present in the incorporated alpha-methyleneglutarimide units.

For example, reaction of the aforesaid polymers with ethylene oxide and with propylene oxide in solution at about 150–220° C. yields graft polymers having polyalkylene oxide side chains attached to the imide nitrogen atoms of the polymers. These graft polymers are useful as surface active agents and as hydroxyl-bearing components for reaction with diisocyanates to make polyurethane coatings.

Combinations of the aforesaid polymers and copolymers with epoxy resins known to the art, such as, for example, the diglycidyl ethers which are obtained by reacting epichlorohydrin and 2,2-bis(4-hydroxyphenyl) propane or the glycidyl ethers of Novolak resins which are produced from phenol, formaldehyde, and epichlorohydrin, are dissolved in suitable solvents applied to various substrates (metal, glass) and the latter are then heated at about 150–220° C. to produce durable, flexible coatings having excellent adhesion to the substrate. The coatings are rendered insoluble by the heating and it is believed that the crosslinking takes place by the reaction of the epoxy groups with the imide groups of the aforesaid polymers.

If the alpha-methyleneglutarimide polymers and copolymers of this invention, prepared by thermal or free radical initiation, are combined with di- and poly-isocyanates, such as, for example, tolylene diisocyanate, diphenylmethane diisocyanate, and triphenylmethane triisocyanate, and heated at 150–200° C., crosslinked, resistant coatings of good adhesion are also obtained. It is believed that reaction of the isocyanate groups also takes place at the relatively acidic imide hydrogen of the combined alpha-methyleneglutarimide units in the aforesaid copolymers.

When the polymers and copolymers of this invention are reacted with formaldehyde (as provided by paraformaldehyde), hydroxymethyl groups are introduced on the imide nitrogen atoms of the incorporated alpha-methyleneglutarimide units. When these hydroxymethylated polymers are heated to the softening point, crosslinking takes place and insoluble, durable coatings are produced. Blends of the hydroxymethylated polymers and copolymers of the invention with reactive phenol-formaldehyde resins are converted by further condensation by heat to a thermoset mass which differs from the phenol-formaldehyde resin itself in having improved flexibility.

The invention will be more fully understood by reference to the following illustrative embodiments.

EXAMPLE I

Homopolymerization of alpha-methyleneglutarimide in bulk without added initiator (A) Preparation of alpha-methyleneglutarimide.—To 400 g. (228 ml.) of 85.5% sulfuric acid was added, with stirring, 186 g. (1.72 moles) of alpha-methyleneglutaronitrile, over a period of about two hours at a temperature of 44–62° C. The reaction mixture was then slowly heated to 66° C., and held at that temperature for 15 minutes. It was poured into 2000 ml. of cold (30° C.) isopropanol. The solution was allowed to stand and dry ammonia gas was fed into the solution until it was neutral (pH=7). This neutralization required about two hours for completion and was accompanied by a rise in temperature from 24° C. to a maximum of 70° C. The mixture was allowed to cool to 40° C. and then filtered. On cooling, the filtrate deposited a total of 89.3 (39.3%) of crystals of crude alpha-methyleneglutarimide, M.P. 117–122° C. Recrystallization of this product from benzene, then from ethanol, followed by vacuum sublimation, yielded an analytical sample, having a melting point of 120–121.5° C. (corr.).

*Analysis.*—Calculated for $C_6H_7NO_2$: C, 57.59%; H, 5.64%; N, 11.19%. Found: C, 57.71%; H, 5.62%; N, 11.09%.

The infrared absorption spectrum of the compound showed strong absorption at 958 cm.$^{-1}$ (conjugated, terminal methylene), 1627 cm.$^{-1}$ (C=C stretching), at 1715 and 1680 cm.$^{-1}$ (C=O stretching).

The NMR spectrum (in deuterochloroform, $DCCl_3$) contained peaks at 2.68 p.p.m. to tetramethylsilane (protons on saturated carbon), as well as at 5.63 and 6.32 p.p.m. (protons on terminal double bond), and at 9.13 p.p.m. (proton on nitrogen); integration of the areas under the peaks yielded a ratio of 4:2:1, respectively, in accord with the proposed alpha-methyleneglutarimide structure.

The alpha-methyleneglutarimide made in accord with the above procedure was used in carrying out the following polymerization experiments.

(B) Thermal Polymerization.—Using a glass polymerization tube there was charged 2.00 g. of purified, sublimed alpha-methyleneglutarimide (M.P. 120–121° C., corr.). The tube was alternately evacuated and filled with nitrogen four times, and then sealed. It was placed in an oil bath at 135±2° C. After melting, the monomer resolidified in about one-half hour. The tube was removed from the bath after one and one-third hours total heating time and opened. The polymerized alpha-methyleneglutarimide was a clear, pale yellow, brittle solid (2.01 g.). The polymer softened at about 183° C. (Fisher-Johns melting point apparatus) and decomposed at about 308–329° C. (DTA), inherent viscosity=0.16 dl./g. (0.50 g./100 ml., dichloroacetic acid, 135° C.).

The infrared absorption spectrum (KBr pellet) contained a medium band at 3220 cm.$^{-1}$ for N–H; broad, weak absorption in the aliphatic C–H stretching region at 2940, 2850 cm.$^{-1}$; a single strong carbonyl bond at 1685 cm.$^{-1}$ with a shoulder at 1718 cm.$^{-1}$; and sharp bands at 1440 (w), 1405 (w), 1365 (m), 1315 (w), 1258 (m), 1190 (s), and 800–740 cm.$^{-1}$ (w, broad).

Thermal polymerization of alpha-methyleneglutarimide was also observed by means of a differential thermal analyzer. A 20 mg. specimen in the analyzer tube was heated at the rate of 10° C./min. At 117° C. a sharp endotherm due to the melting point of the substance was observed. As the heating was continued, a rounded exotherm was observed at 213° C. corresponding to polymerization. Further continued heating led to an endotherm of decomposition at 322° C., accompanied by darkening and gas evolution.

EXAMPLE II

Benzoyl peroxide-initiated polymerization of alpha-methyleneglutarimide (A) Polymerization.—In a dry test tube was placed 4.00 g. of purified, sublimed alpha-methyleneglutarimide prepared as described in Example I. The tube was alternately evacuated and filled with nitrogen four times. The nitrogen-filled tube was fitted with a rubber serum cap, and to it was added 20 mg. of benzoyl peroxide and 8.0 ml. of purified N,N-dimethylacetamide. The tube was placed in an oil bath at 70° C. to effect polymerization. Solid polymer began to separate from the clear solution after 12 minutes. After one hour, the contents of the tube were added to 75 ml. of methanol. The polymer was collected, washed with methanol, and dried under vacuum at 40° C., 2.36 g. (59%), white powder, decomposing at about 358–377° C. (DTA), inherent viscosity =0.61 dl./g. (0.50 g./100 ml., dichloroacetic acid, 135° C.). The polymer was amorphous to X-rays.

A sample was dried thoroughly in vacuum at 138° C. for analysis.

*Analysis.*—Calculated for $(C_6H_7NO_2)_n$: N, 11.19%. Found: N, 10.55%.

Prolonged extraction (58 hrs.) with acetone (Soxhlet) resulted in a weight loss of only 5.44%. The infrared absorption spectrum of the extracted sample contained medium absorption at 3220 cm.$^{-1}$ (NH) and a strong, single carbonyl absorption at 1688 cm.$^{-1}$ with a shoulder at 1720 cm.$^{-1}$. Bands at 1440 (w), 1415 (w), 1355 (m), 1260 (m), 1198 (s), and 850–760 cm.$^{-1}$ (w, broad) corresponded closely with similar bands in the spectrum for the polymer prepared according to Example I(B).

(B) Polymer hydrolysis.—A 0.775 g. sample of unextracted polymer prepared as in Example II(A) above, was hydrolyzed by refluxing 21.5 hrs. in 50 ml. concentrated hydrochloric acid solution. The solid residue which resulted was collected and dried in vacuum, 0.775 g. (91.3% as poly-alpha-methyleneglutaric acid). This solid was pale tan, brittle, but rather hard. Its infrared absorption spectrum supported the polymeric acid structure. Evaporation of the filtrate to dryness produced a white solid. The infrared absorption spectrum of the substance confirmed its identity as ammonium chloride, 0.232 g. (70%).

EXAMPLE III

Sodium-initiated polymerization of alpha-methyleneglutarimide

In a stirred flask was placed 3.00 g. of purified, sublimed alpha-methyleneglutarimide and 2.83 ml. of purified, N,N-dimethylacetamide. The mixture was heated to about 95° C. to effect solution, and 2 drops of a 50% dispersion of sodium in xylene was added. A vigorous exothermic reaction took place and the temperature rose to 140–150° C. and the mixture became too viscous to stir. After cooling to 100° C., the contents of the flask were added to water to terminate the reaction. The polymer which separated was collected, washed with water, ethanol, and dried to yield a white solid (Fraction A), 1.304 g. (43.5%), softening point 221° C. (DTA). Centrifugation of the turbid filtrate yielded a further 1.114 g. (37.2%) of white solid (Fraction B). The inherent viscosity of Fraction A was 0.094 dl./g. (0.50 g./100 ml. m-cresol, 22.8° C.); that of Fraction B, which contained 15% of material insoluble in m-cresol, was 0.14 dl./g.

The infrared absorption spectrum (KBr pellet) of this polymer showed very weak absorption at 3250 cm.$^{-1}$ for the NH group as compared to that of the polymer of Example I–B, prepared by thermal initiation, and the polymer of Example II–A, prepared by benoxyl peroxide initiation. Carbonyl absorptions were resolved into two distinct peaks at 1720 and 1670 cm.$^{-1}$. Rather broad-based absorptions were present at 1433 (w), 1350 (s), 1320 (m, shoulder) 1255 (w), 1188 (m), and 1150 cm.$^{-1}$ (m). The absorption pattern in this region was distinctly different in appearance from those in the spectra of the polymers of Example I–B and Example II–A.

The relatively weak absorption for the NH group is in accord with the polymer structure (II) formed by hydrogen migrational polymerization.

EXAMPLE IV

Butyllithium-initiated polymerization of alpha-methyleneglutarimide (A) Polymerization.—In a manner similar to that described in Example II, a nitrogen-filled test tube was charged with 1.00 g. purified, sublimed alpha-methyleneglutarimide and 2.0 ml. of purified N,N-dimethylacetamide. The tube was fitted with a rubber serum cap and was placed in an oil bath at 70° C. When solution was complete, 0.10 ml. of an approximately 1.6 M solution of n-butyllithium in hexane was injected. After 1 hour at 70° C. the solution in the test tube was viscous, but remained clear. The contents of the tube were poured into 25 ml. of methanol. The solid which precipitated was collected, washed well with methanol, and dried under vacuum at 40° C., 0.968 g. (96.8%) white powder, softening point 210° C., (Fisher-Johns melting point apparatus), decomposition point about 246° C. (DTA), inherent viscosity=0.092 dl./g. (0.50 g./100 ml., dichloroacetic acid, 135° C.).

The infrared absorption spectrum (KBr pellet) showed very weak absorption at 3250 cm.$^{-1}$ for NH. The strong carbonyl absorption was resolved into two peaks at 1720 cm.$^{-1}$ and 1670 cm.$^{-1}$. Peaks at 1430 (w), 1350 (s), 1185 (m), and 1150 cm.$^{-1}$ (m) strongly resembled similar peaks in the spectrum of the polymer prepared as described in Example III, and different from peaks in this region of the spectra of the polymers of Example I–B and Example II–A, prepared by thermal and peroxide initiation, respectively.

The relatively weak absorption in the infrared for the NH group is in accord with the theory that the polymer is formed by hydrogen-migrational polymerization and has structure (II).

(B) Polymer hydrolysis.—A 0.665 g. sample of the polymer was refluxed 20.5 hrs. in 30 ml. of concentrated hydrochloric acid solution. This polymer, in contrast to the free-radical polymer of Example II–B, dissolved almost at once. On cooling, the solution remained clear and contained less than 1 mg. of solid. Evaporation to dryness in vacuum gave a brown, glassy solid, 1.04 g. (99.2% as alpha-aminomethylglutaric acid hydrochloride). The infrared absorption spectrum of this residue was that to be expected for this proposed structure.

EXAMPLE V

Copolymerization of alpha-methyleneglutarimide with methyl methacrylate

In a manner similar to that described in Example II, a mixture of 2.22 g. (1.78 mm.) of alpha-methyleneglutarimide, 1.77 g. (1.77 mm.) methyl methacrylate, and 8.0 ml. N,N-dimethylacetamide in a $N_2$ filled test tube, stoppered with a rubber serum cap, was placed in a 70° C. oil bath. When dissolution was complete, 1.00 ml. of a 2% (w./v.) solution of benzoyl peroxide in N,N-dimethylacetamide was added by hypodermic syringe. After about 10 minutes a precipitate formed. At the end of one hour, the contents of the tube were poured into 75 ml. of methanol, containing a few crystals of hydroquinone. The precipitate was collected, washed with methanol; and dried under vacuum at 40° C., 0.745 g. (18.6%), decomposition range, 314–326° C. (DTA). The copolymer had an inherent viscosity of 0.33 dl./g. (0.50 g./100 ml. dimethylacetamide, 50° C.). Nitrogen analysis of the dried polymer indicated a composition of about 76.5 mole percent alpha-methyleneglutarimide and about 23.5 mole percent methyl methacrylate.

*Analysis.*—Calculated (for a 76.5 mole percent alpha-methyleneglutarimide copolymer): N, 8.99%. Found: N, 8.98%.

EXAMPLE VI

Copolymerization of alpha-methyleneglutarimide with styrene

In a manner similar to that described in Example II, a nitrogen-filled test tube stoppered with a rubber serum cap was charged with a mixture of 2.19 g. (1.75 mm.) of alpha-methyleneglutarimide, 1.81 g. (1.74 mm.) of freshly-distilled styrene, and 8.0 ml. of purified N,N-dimethylacetamide. The tube was placed in a 70° C. oil bath and, when dissolution was complete, 1.00 ml. of a 2% (w./v.) solution of benzoyl peroxide in N,N-dimethylacetamide was injected by hypodermic syringe. After one and one-quarter hours the clear solution was poured into 25 ml. of methanol containing a few crystals of hydroquinone. The polymer which separated was collected, washed well with methanol, and dried, 1.412 g. (35.3%), white powder. Nitrogen analysis indicated that the copolymer contained about 59.5 mole percent alpha-methyleneglutarimide and about 40.5 mole percent styrene.

*Analysis.*—Calculated (for a 59.5 mole percent alpha-methyleneglutarimide copolymer): N, 7.18%. Found: N, 7.16%.

The infrared absorption spectrum of the copolymer (KBr pellet) showed medium absorption attributable to combined styrene: 695, 750 cm.$^{-1}$ (phenyl group), 1600, 1490 cm.$^{-1}$ (aromatic ring), and 3020 cm.$^{-1}$ (aromatic hydrogen). Other characteristic absorptions for combined alpha-methyleneglutarimide units were noted, as described in Example II–A.

Extraction (Soxhlet) for 56 hrs. with acetone resulted in only a 5.68% weight loss by the copolymer. The copolymer sintered and softened at about 270° C. (Fisher-Johns melting point apparatus), and decomposed above about 340° C. (DTA).

EXAMPLE VII

Copolymerization of alpha-methyleneglutarimide with acrylonitrile

In a manner similar to that described in Example II, a nitrogen-filled test tube as charged with 2.91 g. (22.5 mm.) alpha-methyleneglutarimide, 1.19 g. (22.5 mm.) freshly-distilled acrylonitrile, and 8.0 ml. of purified N,N-dimethylacetamide. The test tube was stoppered with a rubber serum cap and placed in a 70° C. oil bath. As soon as dissolution was complete, 1.0 ml. of a 2% (w./v.) solution of benzoyl peroxide in N,N-dimethylacetamide was added. Solid began to precipitate, and after a period of 48 minutes at 70° C. had elasped, the contents of the tube were poured into 75 ml. of methanol. The polymer was collected, washed with methanol, and dried, 1.07 g. (26.8%) white, friable solid, inherent viscosity=0.39 dl./g. (0.50 g./100 ml., dichloroacetic acid, 135° C.). The copolymer decomposed at about 330° C. (DTA). Nitrogen analysis of the dried copolymer showed a composition of about 93.5 mole percent alpha-methyleneglutarimide and about 6.5 mole percent acrylonitrile.

*Analysis.*—Calculated (for copolymer containing 93.5 mole percent alpha-methyleneglutarimide): N, 11.72%. Found: N, 11.70%.

In addition to characteristic absorption for combined alpha-methyleneglutarimide units as described in Example II–A, the infrared absorption spectrum (KBr pellet) contained a weak absorption at 2230 cm.$^{-1}$ which is attributable to the nitrile group of the acrylonitrile.

The invention has been described in the hereinabove examples in preferred embodiment, but it is to be understood that the invention is in no way confined to the particular forms or uses shown and described, the same being merely illustrative, and that the invention may be made and carried out in other ways without departure from the spirit of the invention, and therefore there is claimed the right to employ all equivalents coming within the scope of the appended claims and by means of which the objects of the invention are obtained and new results and advantages accomplished.

What is claimed is:

1. The solid homopolymer of alpha-methyleneglutarimide consisting essentially of the recurring unit:

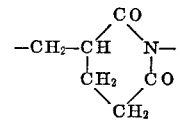

2. The process for forming solid homopolymers of alpha-methyleneglutarimide which comprises contacting the alpha-methyleneglutarimide with an alkali metal at temperatures of −100° C. to 200° C.

3. The process of claim 2 in which the alkali metal is sodium.

4. The process of claim 2 wherein the temperature range is −50° C. to +50° C.

5. The process of claim 2 wherein the alkali metal is potassium, sodium or lithium.

6. The process of claim 2 wherein the process is carried out in solution.

7. The process for forming solid homopolymers of alpha-methyleneglutarimide which comprises contacting the alpha-methyleneglutarimide with an organometallic initiator selected from the group consisting of lower metal alkyls and lower metal alkoxides, wherein the metal is lithium, sodium, potassium, magnesium or zinc, at temperatures of −100° C. to 200° C.

8. The process of claim 7 in which the organo-metallic initiator is butyllithium.

9. The process of claim 7 wherein the temperature range is −50° C. to +50° C.

10. The process of claim 7 wherein the initiator is selected from the group consisting of butyllithium, butylsodium, diethylmagnesium, diethylzinc, sodium ethoxide, sodium isopropoxide and potassium t-butoxide.

11. The process of claim 7 wherein the process is carried out in solution.

12. The process for forming solid homopolymers of alpha-methyleneglutarimide which comprises contacting the alpha-methyleneglutarimide with an organometallic initiator selected from the group consisting of ethylmagnesium chloride and phenylmagnesium bromide at temperatures of −100° C. to 200° C.

References Cited

UNITED STATES PATENTS

| | | | |
|---|---|---|---|
| 3,355,458 | 11/1967 | Meigs et al. | 260—78 UA |
| 3,452,117 | 6/1969 | Gaylord | 260—78 UA |
| 3,475,386 | 10/1969 | Meigs et al. | 260—78 UA |
| 3,542,744 | 11/1970 | Reimschoessel et al. | 260—78 L |

HAROLD D. ANDERSON, Primary Examiner

U.S. Cl. X.R.

117—161 P, 161 UA; 260—29.6 HN, 30.2, 30.8 DS, 31.2 N, 32.4, 32.6 N, 32.8 N, 33.4 R, 33.6 R, 78 SC, 836, 841